US012562622B2

(12) United States Patent
Oechslen et al.

(10) Patent No.: US 12,562,622 B2
(45) Date of Patent: Feb. 24, 2026

(54) COOLING SYSTEM FOR EFFECTIVE COOLING OF AN ELECTRIC MACHINE OF A MOTOR VEHICLE

(71) Applicant: Dr. Ing. h.c. F. Porsche Aktiengesellschaft, Stuttgart (DE)

(72) Inventors: Stefan Oechslen, Stuttgart (DE); Simon Kuebler, Untergruppenbach Unterheinriet (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 234 days.

(21) Appl. No.: 18/321,807

(22) Filed: May 23, 2023

(65) Prior Publication Data

US 2023/0387756 A1     Nov. 30, 2023

(30) Foreign Application Priority Data

May 30, 2022     (DE) .......................... 102022113563.2

(51) Int. Cl.
H02K 9/197 (2006.01)
H02K 9/193 (2006.01)

(52) U.S. Cl.
CPC ............. H02K 9/197 (2013.01); H02K 9/193 (2013.01)

(58) Field of Classification Search
CPC ........... H02K 9/197; H02K 9/193; H02K 9/19
See application file for complete search history.

(56) References Cited

U.S. PATENT DOCUMENTS

| | | | | | |
|---|---|---|---|---|---|
| 1,679,457 | A | * | 8/1928 | Wiard | ...................... H02K 9/06 |
| | | | | | 292/307 R |
| 3,995,181 | A | * | 11/1976 | Suit | .......................... H02K 3/24 |
| | | | | | 165/104.31 |
| 11,623,508 | B2 | | 4/2023 | Oechslen | |
| 2006/0113851 | A1 | | 6/2006 | Ishihara et al. | |
| 2008/0296147 | A1 | * | 12/2008 | Jaksic | ................... C01B 32/164 |
| | | | | | 422/186.21 |
| 2013/0313928 | A1 | * | 11/2013 | McKinzie | ................ H02K 1/32 |
| | | | | | 310/54 |

(Continued)

FOREIGN PATENT DOCUMENTS

| | | |
|---|---|---|
| DE | 1050434 B | 3/1956 |
| DE | 2850197 A1 | 6/1980 |

(Continued)

*Primary Examiner* — Tulsidas C Patel
*Assistant Examiner* — Robert E Mates
(74) *Attorney, Agent, or Firm* — LEYDIG, VOIT & MAYER, LTD.

(57) ABSTRACT

A cooling system for cooling an electric machine of a motor vehicle, including a supply line, at least one cooling line, and a bypass line. The supply line is for supplying a cooled coolant to a first winding head region of the electric machine. The at least one cooling line leads from the first winding head region through a stator of the electric machine up to a second winding head region of the electric machine. The bypass line is guided from the first winding head region to the second winding head region past the stator. The bypass line, to collect and/or discharge air, exits from the first winding head region at a highest position in a direction of gravity and/or opens into the second winding head region at a highest position in the direction of gravity.

12 Claims, 1 Drawing Sheet

(56) References Cited

U.S. PATENT DOCUMENTS

| | | |
|---|---|---|
| 2020/0295617 A1 | 9/2020 | Cunningham et al. |
| 2021/0006132 A1* | 1/2021 | Steinz ................. F16H 57/0417 |
| 2021/0091611 A1* | 3/2021 | Volbers ................... H02K 3/18 |
| 2021/0143699 A1* | 5/2021 | Alsman .................... H02K 3/28 |
| 2021/0170858 A1 | 6/2021 | Kishimoto et al. |
| 2022/0094224 A1 | 3/2022 | Huser et al. |
| 2022/0123628 A1 | 4/2022 | Nakamatsu |

FOREIGN PATENT DOCUMENTS

| | | |
|---|---|---|
| DE | 102012221325 A1 | 5/2014 |
| DE | 102018113319 A1 | 12/2019 |
| DE | 102018218731 A1 | 4/2020 |
| DE | 102019117893 A1 | 1/2021 |
| DE | 112020001070 T5 | 12/2021 |
| WO | WO 9507323 A1 | 3/1995 |

* cited by examiner

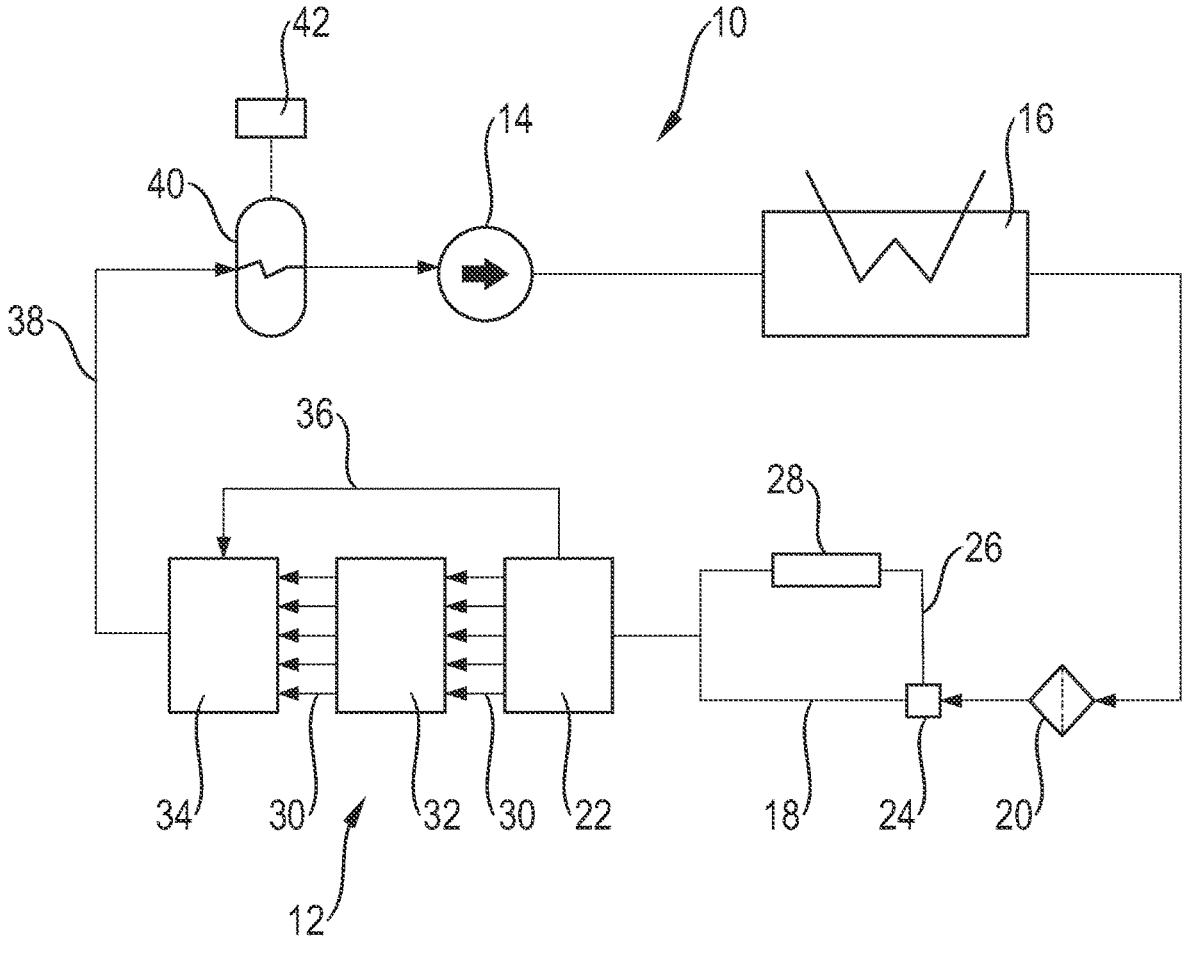

COOLING SYSTEM FOR EFFECTIVE COOLING OF AN ELECTRIC MACHINE OF A MOTOR VEHICLE

CROSS REFERENCE TO RELATED APPLICATIONS

This application claims benefit to German Patent Application No. DE 10 2022 113 563.2, filed on May 30, 2022, which is hereby incorporated by reference herein.

FIELD

The invention relates to a cooling system with the aid of which an electric machine of a motor vehicle can be effectively cooled.

BACKGROUND

A cooling system for cooling an electric machine of an automobile is known from US 2021/0170858 A1, in which, with the aid of a coolant, a power electronics for the electric machine is initially cooled and, subsequently, at least a part of the coolant coming from the power electronics is branched off for cooling of the electric machine and recollected for cooling of the coolant in a radiator.

There is a constant need to make the cooling of electric machines of motor vehicles more effective.

SUMMARY

In an embodiment, the present disclosure provides a cooling system for cooling an electric machine of a motor vehicle, comprising a supply line, at least one cooling line, and a bypass line. The supply line is for supplying a cooled coolant to a first winding head region of the electric machine. The at least one cooling line leads from the first winding head region through a stator of the electric machine up to a second winding head region of the electric machine. The bypass line is guided from the first winding head region to the second winding head region past the stator. The bypass line, to collect and/or discharge air, exits from the first winding head region at a highest position in a direction of gravity and/or opens into the second winding head region at a highest position in the direction of gravity.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 shows a schematic diagram of a cooling system for an electric machine of a motor vehicle.

DETAILED DESCRIPTION

In an embodiment, the present invention provides measures that enable an effective cooling of an electric machine of a motor vehicle.

An aspect of the invention relates to a cooling system for cooling an electric machine of a motor vehicle having a supply line for supplying a cooled coolant to a first winding head region of the electric machine, at least one cooling line leading from the first winding head region through a stator, in particular through a stator groove of the stator, of the electric machine, up to a second winding head region of the electric machine and a bypass line guided from the first winding head region to the second winding head region past the stator, wherein the bypass line, in order to collect and/or discharge air, exits from the first winding head region at a highest position in the direction of gravity and/or opens into the second winding head region at a highest position in the direction of gravity.

The cooling system can in particular be used for direct cooling of current-conducting components by using an electrically non-conductive fluid, for example a dielectric liquid, in particular anhydrous propylene glycol, as the coolant. Thermal resistors between the current-conducting components, in particular conductive rails, and the coolant can thereby be minimized and a high cooling capacity can be achieved. Here, the components to be cooled, that is to say, the winding heads of the electric machine provided in the respective winding head region, the windings of the electric machine inserted into the stator grooves and/or a power electronics for operating the electric machine, and/or the busbars for electrically connecting the e-machine and the power electronics, can be arranged in a sufficiently sealed volume that can be perfused by the coolant, which is bounded, for example, by a housing having passage openings for the coolant.

However, it has been found that gaseous constituents can be contained in the basically liquid coolant. For example, air can be entrained from an expansion tank, gases dissolved in the liquid due to pressure losses can leak out, and/or coolant can be evaporated at particularly hot contact points of the component to be cooled. Compared to the liquid coolant, only a lower heat dissipation is possible for the gaseous constituents. It is possible to collect and discharge gases present and/or produced in the winding head region through the bypass line connected to the winding head regions at the highest point. The proportion of gaseous constituents of the coolant that flushes the winding heads in the first winding head region can thereby be reduced, and the heat transfer performance can be improved. In addition, the proportion of gaseous constituents of the coolant that cools the windings in the stator slots can also be reduced, which in turn can improve the heat transfer performance. Advantageously, the gases present and/or produced in the second winding head region are also collected and discharged. Preferably, in the vicinity of an outlet of the bypass line into the second winding head region, an inlet of a drain leading to a pump and/or compressor is provided, so that gaseous components pushed out of the bypass line into the second winding head region can be removed as immediately as possible again via the drain, possibly with further gaseous components present in the winding head region. In this case, the bypass line can be dimensioned such that the expected flow rate of a gas phase in the first winding head region can be pushed through the bypass line by a portion of the coolant also conducted through the bypass line, in particular as a plug flow. A buildup of a gas phase in the bypass line can thereby be avoided. Although a portion of the liquid coolant is discharged via the bypass line and does not participate in the cooling in the stator, the cooling capacity can ultimately be increased by the gas phase entrained in the bypass line, so that an effective cooling of an electric machine of a motor vehicle is enabled.

Current-perfused windings can be introduced into the stator grooves, which form an electric motor that cooperates with the rotor. The windings can project axially out of the stator and can be electrically connected to a further winding into another stator groove via a respectively assigned winding head. Windings of the respective stator groove associated with different phases can be connected to one another via different winding heads. The winding heads, which are in particular arc-shaped and/or angular, can form a deflection of approximately 180° with respect to an axial direction of the stator and an angular offset in the circumferential direction of the stator. The winding heads projecting from the stator on a first axial side are arranged in the first winding head region, while the winding heads projecting from the stator on a second axial side facing away from the first axial side are arranged in the second winding head region. The respective winding head region can be bounded by the associated axial side of the stator and a housing attached to the stator.

The first winding head region and the second winding head region are fluidly connected to one another via the at least one cooling line. For example, the cooling line can be formed as a bore and/or recess in a material of the stator so that the coolant conveyed through the cooling line can cool the stator and thereby at least indirectly cool the windings provided in the stator slots. The mass flow conveyed by the totality of the cooling lines is in particular significantly larger than the mass flow conveyed by the bypass line. For example, the mass flow conveyed by the totality of the cooling lines is greater than the mass flow conveyed by the bypass line at least by a factor of 5, and in particular at least by a factor of 20, preferably at least by a factor of 100. Preferably, the cooling channel is configured as a recess within the respective stator groove, so that a direct cooling of the windings within the stator groove by the coolant is enabled.

The supply line and the bypass line can in particular be configured as pipes, each of which can each be fluid-tightly connected via a suitable seal in order to avoid a leakage of the coolant.

In particular, it is provided that the flow direction of the coolant introduced into the first winding head region produces an annular flow flowing in the circumferential direction in the first winding head region and/or the flow direction of the coolant introduced into the second winding head region produces an annular flow flowing in the circumferential direction in the second winding head region. For example, the coolant can be introduced into the respective winding head region with a flow direction that points at least proportionately in tangential direction. Preferably, the particular flow direction of the coolant when entering the particular winding head region points to a greater extent in tangential direction than in axial direction of an axis of rotation of a rotor of the electric machine. This can result in the annular flow in the respective winding head region, which can help to achieve a particularly good flushing of the winding heads and thus a high cooling capacity. Through the coolant flowing into the first winding head region, coolant already located in the first winding head region can be displaced into the at least one cooling channel.

Preferably, the first winding head region and/or the second winding head region can be perfused by the total mass flow of the coolant. The mass flow of the coolant provided by a conveying device, in particular a pump or compressor, can reach the first winding head region and the second winding head region. As a result, the full mass flow of the coolant can be available in the winding heads for heat dissipation.

Preferably, a branch line branched off in the flow direction upstream of the first winding head region from the supply line is provided for cooling a power electronics of the electric machine and/or a part thereof and/or busbars electrically connecting the e-machine and the power electronics, wherein the branch line leads to the first winding head region via the supply line or past the supply line. The coolant can thereby also be used for cooling the power electronics, for example a control circuit and/or a pulse inverter, of the electric machine. A separate cooling of the power electronics can thereby be saved. The coolant branched off via the branch line is supplied back downstream to the supply line or supplied directly to the first winding head region, so that the mass flow of the coolant branched off via the branch line is again available for cooling the winding heads.

In particular, it is provided that the branch line exits the supply line via an actuator valve in order to adjust a mass flow branched off into the branch line, wherein the actuator valve is controllable depending on a detected cooling demand for at least a part of the power electronics and/or the busbars connecting the e-machine and the power electronics. With the aid of the control valve, it is possible to branch off only as much coolant from the supply line as is currently necessary for cooling the components to be cooled. Unnecessary pressure losses can thereby be avoided. An optimal cooling can thus be achieved with as little hydraulic loss as possible.

Preferably, the second winding head region is fluidly connected to the supply line via an expansion tank, in particular in order to discharge air to the environment, via a pump for conveying the coolant, and via a radiator for cooling the coolant. Thereby, a coolant circuit can be formed for the coolant. In doing so, it is possible for the coolant circuit to output gaseous constituents into the environment. The coolant circuit can also be closed by condensing and reusing gaseous constituents of the coolant. The radiator for cooling the coolant can in particular be configured by the front radiator of the motor vehicle. Preferably, the pump can be electrically driven by the electric machine in order to convey the coolant.

Preferred as the coolant is a dielectric liquid having a maximum density of 0.75 kg/l at 15° C. and/or a maximum viscosity of 6 mm$^2$/s at 40° C. and/or a minimum thermal capacity of 2.3 kJ/(kg*K) at 80° C. and/or a minimum thermal conductivity of 0.12 W/(m/K) at 80° C. and/or a maximum electrical conductivity of 1000 nS/m at 25° C. Suitable electrically non-conductive liquids are specified in WO 95/07323 A1, the contents of which are hereby incorporated by reference. This allows for a direct cooling of current-conducting components without interposed insulation that could impair the heat transfer.

In particular, an electrical contacting of the electric machine with feed conductors for supplying electrical energy is configured in the first winding head region. The feed conductors can be guided out of the first winding head region in order to exchange electrical energy with the electric machine operated in engine mode or in generator mode. The feed conductors typically have an electrical insulation. In addition, a high degree of heat is produced at the contact point of the feed conductors with the associated winding head. Because the coolant is first supplied to the first winding head region with the feed conductor provided therein, the coolant can still be present at a particularly low temperature and can absorb a correspondingly high amount of heat quickly. It can be considered here that, in the second winding head region, in which no feed conductors are provided, a correspondingly lower heat transfer capacity is required, and a certain intermediate heating of the coolant can be permitted.

Preferably, it is provided that winding heads within the first winding head region and/or within the second winding head region and/or electronic components of the component are non-insulated and are positioned openly so as to be directly surrounded by the coolant. This allows a particularly low thermal transfer resistance between the current-conducting components and the coolant. The coolant is in particular configured as a dielectric liquid, in order to avoid short circuits.

Preferably, the electric machine is configured for purely electric propulsion of the motor vehicle. The electric machine is thereby configured for a correspondingly high generation of power in engine mode, which leads to a correspondingly high cooling demand. Due to the improved cooling capacity with the aid of the cooling system, the increased cooling demand can be provided at a low design cost. In particular, the cooling system allows for a particularly high cooling capacity, so that the electric machine can even be configured to drive a sports car or race car purely electrically.

Embodiments of the invention are explained by way of example below with reference to the accompanying drawing on the basis of a preferred embodiment example, wherein the features presented below can represent an aspect of the invention both individually and in combination.

The cooling system 10 shown in FIG. 1 can be provided for cooling an electric machine 12 ("traction machine") provided for electrically driving a motor vehicle. A coolant, in particular a dielectric one, can be supplied from a pump 14 to a radiator 16 in order to cool the coolant to a desired operating temperature. From the radiator 16, the cold coolant can be supplied to a first winding head region 22 of the electric machine 12 via a supply line 18 after passing through a filter 20. In particular, there is an actuator valve 24 in the supply line 18 for supplying a portion of the mass flow of the coolant via a branch line 26 to a component 28, for example a power electronics, of the electric machine 12 and for cooling the component 28. The coolant coming from the component 28 can again be supplied to the supply line 18 or directly supplied to the first winding head region 22 of the electric machine 12 via a separate terminal.

In the first winding head region 22, an annular flow can arise, with the help of which the winding head and supply lines provided in the first winding head region 22 can be cooled. The coolant can be pushed from the first winding head region 22 into a plurality of cooling lines 30 in order to cool a stator 32, in particular the windings of the electric machine 12 provided in stator grooves. The cooling lines 30 open into a second winding head region 34 on an axially opposed side of the electric machine 12. In the second winding head region 34, an annular flow can arise, with the help of which the winding head provided in the second winding head region 34 can be cooled.

Because hydraulic free spin zones can result in the winding head regions 22, 34 and/or gaseous components can occur, a bypass line 36 is located at the highest position of the first winding head region 22 in the direction of gravity, which can collect a gas phase formed in the first winding head region 22 and convey liquid coolant past the stator 32 into the second winding head region 34 with the aid of liquid conveyed through the bypass line 36. Preferably, the bypass line 36 opens into the second winding head region 34 at the highest position in the direction of gravity or somewhat below it. A drain 38 is connected to the second winding head region 38, wherein the drain 38 is particularly preferably connected in the vicinity of a confluence of the bypass line 36 into the second winding head region 34 in order to discharge the gas phase supplied from the bypass line 36 as immediately as possible and supply it to an expansion tank 40. The gaseous constituents can be output to the environment from the expansion tank 40 and dried and/or condensed in an air dryer 42 configured in particular as an absorber. The liquid coolant can be conveyed back in a circuit from the pump 14 out of expansion tank 40.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A cooling system for cooling an electric machine of a motor vehicle, comprising:
   a supply line for supplying a cooled coolant to a first winding head region of the electric machine;
   at least one cooling line leading from the first winding head region through a stator of the electric machine up to a second winding head region of the electric machine; and
   a bypass line guided from the first winding head region to the second winding head region past the stator,
   wherein the bypass line, to collect and/or discharge air, exits from the first winding head region at a highest position in a direction of gravity and/or opens into the second winding head region at a highest position in the direction of gravity,
   wherein a branch line branched off in a flow direction upstream of the first winding head region from the supply line is provided for cooling at least one further component of the electric machine, and
   wherein the branch line leads to the first winding head region via the supply line or past the supply line.

2. The cooling system according to claim 1, wherein the branch line exits the supply line via an actuator valve in order to adjust a mass flow branched off into the branch line, wherein the actuator valve is controllable depending on a cooling demand detected for the at least one further component.

3. The cooling system according to claim 1, wherein winding heads within the first winding head region and/or within the second winding head region and/or electronic components of the at least one further component are non-insulated and are positioned openly so as to be directly surrounded by the coolant.

4. The cooling system according to claim 1, wherein a flow direction of the coolant introduced into the first winding head region produces an annular flow flowing in a circumferential direction in the first winding head region and/or the flow direction of the coolant introduced into the second winding head region produces an annular flow flowing in the circumferential direction in the second winding head region.

5. The cooling system according to claim 1, wherein the first winding head region and/or the second winding head region can be perfused by a total mass flow of the coolant.

6. The cooling system according to claim 1, wherein the second winding head region is fluidly connected to the supply line via an expansion tank, via a pump for conveying the coolant, and via a radiator for cooling the coolant.

7. The cooling system according to claim 1, wherein the coolant is a dielectric liquid, having a maximum density of 0.75 kg/l at 15° C. and/or a maximum viscosity of 6 mm2/s at 40° C. and/or a minimum thermal capacity of 2.3 kJ/

(kg*K) at 80° C. and/or a minimum thermal conductivity of 0.12 W/(m/K) at 80° C. and/or a maximum electrical conductivity of 1000 nS/m at 25° C.

8. The cooling system according to claim 1, wherein an electrical contacting of the electric machine with feed conductors for supplying electrical energy is arranged in the first winding head region.

9. The cooling system according to claim 1, wherein the electric machine is configured for purely electric drive of the motor vehicle.

10. The cooling system according to claim 1, wherein the at least one cooling line leads from the first winding head region through a stator groove of the stator.

11. The cooling system according to claim 6, wherein the second winding head region is fluidly connected to the supply line via the expansion tank to discharge air to an environment.

12. The cooling system according to claim 1, wherein the bypass line is configured to collect both a liquid phase of the coolant and a gaseous phase of the coolant and to experience a plug flow of the collected liquid phase and the gaseous phase.

\* \* \* \* \*